United States Patent
Nakanishi et al.

(10) Patent No.: US 11,515,554 B2
(45) Date of Patent: Nov. 29, 2022

(54) MEMBRANE ELECTRODE ASSEMBLY AND SOLID POLYMER FUEL CELL

(71) Applicant: TOYOTA JIDOSHA KABUSHIKI KAISHA, Toyota (JP)

(72) Inventors: Junji Nakanishi, Kasugai (JP); Tsunemasa Nishida, Nagoya (JP); Mikihiro Hori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/314,291

(22) Filed: May 7, 2021

(65) Prior Publication Data

US 2021/0376364 A1 Dec. 2, 2021

(30) Foreign Application Priority Data

May 27, 2020 (JP) .............................. JP2020-091926

(51) Int. Cl.
*H01M 8/1004* (2016.01)
*H01M 8/1032* (2016.01)

(52) U.S. Cl.
CPC ....... *H01M 8/1004* (2013.01); *H01M 8/1032* (2013.01)

(58) Field of Classification Search
CPC ............ H01M 8/1004; H01M 8/1032; H01M 8/1051; H01M 8/1065; H01M 2008/1095; H01M 4/8828; Y02E 60/50
See application file for complete search history.

(56) References Cited

U.S. PATENT DOCUMENTS

2006/0280985 A1   12/2006   Toyoda et al.
2010/0239945 A1   9/2010    Kodama et al.

FOREIGN PATENT DOCUMENTS

| JP | 2006338912 A | 12/2006 |
| JP | 2007194121 A | 8/2007 |
| JP | 2010212247 A | 9/2010 |
| JP | 2020064721 A | 4/2020 |

*Primary Examiner* — Helen Oi K Conley
(74) *Attorney, Agent, or Firm* — Dickinson Wright, PLLC

(57) ABSTRACT

A membrane electrode assembly for the fuel cell includes a solid polymer electrolyte membrane, an anode catalyst layer assembled to one surface of the solid polymer electrolyte membrane, and a cathode catalyst layer assembled to another surface of the solid polymer electrolyte membrane. The membrane electrode assembly contains cerium ions. The membrane electrode assembly includes a power-generation region and a non-power-generation region. The power-generation region includes the catalyst layers on both surfaces of the solid polymer electrolyte membrane in a center portion. The non-power-generation region is without the catalyst layer on at least one surface of the solid polymer electrolyte membrane in an outer periphery portion. A cerium ion content per area in the power-generation region is larger than a cerium ion content per area in the non-power-generation region.

6 Claims, 2 Drawing Sheets

Plan view

Cross-sectional view

MEMBRANE ELECTRODE ASSEMBLY AND SOLID POLYMER FUEL CELL

CROSS REFERENCE TO RELATED APPLICATIONS

The present application claims priority from Japanese patent application JP 2020-091926 filed on May 27, 2020, the entire content of which is hereby incorporated by reference into this application.

BACKGROUND

Technical Field

The present disclosure relates to a membrane electrode assembly and a solid polymer fuel cell.

Description of Related Art

A solid polymer fuel cell, which is a fuel cell that generates electricity using an electrochemical reaction between a fuel gas and an oxidant gas, has attracted attention as an energy source. Since the solid polymer fuel cell allows operation at room temperature while its output density is high, the solid polymer fuel cell has been actively studied as a configuration appropriate for automobile application and the like.

The solid polymer fuel cell generally uses a membrane electrode assembly. The membrane electrode assembly includes a solid polymer electrolyte membrane as an electrolyte membrane, and respective electrodes (a fuel electrode (anode catalyst layer) and an air electrode (cathode catalyst layer)), which are formed of catalyst layers, and are assembled to both surfaces of the solid polymer electrolyte membrane ("fuel electrode-solid polymer electrolyte membrane-air electrode") (hereinafter also referred to as "MEA"). Gas diffusion layers are further assembled to both surfaces of the MEA in some cases, and this is referred to as a membrane electrode gas diffusion layer assembly ("gas diffusion layer-MEA-gas diffusion layer") (hereinafter also referred to as "MEGA").

The electrodes are each formed of a catalyst layer, and the catalyst layer is a layer that causes an electrode reaction by an electrode catalyst included in the catalyst layer. Since a three-phase interface in which three phases of an electrolyte, a catalyst, and a reaction gas coexist is necessary for the progress of the electrode reaction, the catalyst layer is generally formed of the layer that includes the catalyst and the electrolyte. The gas diffusion layer is a layer to supply the reaction gas to the catalyst layer and to give and receive electrons, and a porous material having electron conductivity is used for the gas diffusion layer.

As such a solid polymer fuel cell, for example, JP 2006-338912 A discloses a solid polymer fuel cell that includes a solid polymer electrolyte. The solid polymer electrolyte includes a perfluoro electrolyte and a metal ion. The perfluoro electrolyte includes a cation exchange group. Protons of the cation exchange group are partially replaced by the metal ion. The metal ion is at least one selected from the ions of vanadium (V), manganese (Mn), niobium (Nb), tantalum (Ta), chrome (Cr), molybdenum (Mo), tungsten (W), iron (Fe), ruthenium (Ru), nickel (Ni), palladium (Pd), platinum (Pt), argentum (Ag), cerium (Ce), neodymium (Nd), praseodymium (Pr), samarium (Sm), cobalt (Co), gadolinium (Gd), terbium (Tb), dysprosium (Dy), holmium (Ho), or erbium (Er).

JP 2007-194121 A discloses a solid polymer fuel cell that includes a membrane electrode assembly. The membrane electrode assembly includes a solid polymer electrolyte membrane and electrodes that are assembled to both surfaces of the solid polymer electrolyte membrane and include catalyst layers. In the solid polymer electrolyte membrane, all or a part of protons contained in a non-power-generation region are ion exchanged by one or two or more cations. The non-power-generation region is a region, which is provided in an outer periphery portion of the solid polymer electrolyte membrane, and in which the catalyst layer is not formed on at least one surface of the solid polymer electrolyte membrane. Additionally or alternatively, the solid polymer electrolyte membrane contains an organo-metalloxane polymer in the non-power-generation region. The organo-metalloxane polymer is obtained by immersing the non-power-generation region with a solution containing an organo-metalloxane monomer to hydrolyze and condensation polymerize it. The organo-metalloxane monomer contains ammonium cations or quaternary ammonium cations at the end of the organo-metalloxane monomer. In JP 2007-194121 A, the cation to be exchanged with protons includes one or more selected from a complex cation, a quaternary alkylammonium cation, and a cation in a high valence side that is a metal ion possibly having a plurality of valences and has a valence larger than a minimum valence. Furthermore, the cation in the high valence side includes $Ce^{4+}$, $Pr^{4+}$, $Sm^{3+}$, $Eu^{3+}$, $Tb^{4+}$ or $Yb^{3+}$.

SUMMARY

The solid polymer fuel cell has a problem in that an electrolyte material contained in the solid polymer electrolyte membrane and the like is easily deteriorated by a hydrogen peroxide radical generated by the power generation and the like in the fuel cell.

JP 2006-338912 A discloses that the deterioration of the electrolyte due to the peroxide radical can be avoided by replacing a part of protons of the cation exchange group contained in the perfluoro electrolyte with a certain metal ion.

JP 2007-194121 A discloses that the deterioration of the membrane due to decomposition of polymers by chemical species, such as a radical, (chemical factor) and the deterioration of the membrane due to the damage of the membrane caused by stress (mechanical factor) can be simultaneously suppressed by the ion exchange of all or a part of protons in the solid polymer electrolyte membrane with a certain cation.

However, when the cation is excessively added, the cation is ionic bonded to sulfonic acid to hinder the proton conduction, thereby increasing the proton resistance. Consequently, the reduction in power generation performance is possibly caused.

Accordingly, the present disclosure provides a membrane electrode assembly improved in durability while maintaining a power generation performance, and a solid polymer fuel cell including the same.

As described above, when the cation content is excessive, the excess cations possibly cause the reduction in power generation performance. Meanwhile, when the amount of cation is small, the cation is gradually diffused or discharged outside the system during the power generation of the fuel cell, thereby possibly causing decrease of the effect of durability improvement due to the decreased cationic concentration. That is, the amount of cation causes a problem even when it is excessive or insufficient.

The present inventors examined various means to solve the problem, and found that the hydrogen peroxide (radical generation source) that causes the decomposition of the solid polymer electrolyte membrane is generated especially on the poisoned catalyst at the beginning of power generation. Accordingly, the present inventors found that a lot of cations as a radical quencher are needed at the beginning of the power generation, and subsequently decreasing the cation to a certain extent allows balancing between the power generation performance and the durability of the fuel cell.

Therefore, the present inventors found the follows. In a membrane electrode assembly for a fuel cell that includes a solid polymer electrolyte membrane, an anode catalyst layer assembled to one surface of the solid polymer electrolyte membrane, and a cathode catalyst layer assembled to the other surface of the solid polymer electrolyte membrane, cerium ions as a radical quencher are introduced and a non-power-generation region in which the catalyst layer is not formed on at least one surface of an outer periphery portion of the solid polymer electrolyte membrane is formed. A cerium ion content per area in a power-generation region in a center portion in which the anode catalyst layer and the cathode catalyst layer are assembled to the solid polymer electrolyte membrane is made large compared with a cerium ion content per area in the non-power-generation region. Accordingly, the cerium ions as the radical quencher diffuse from the power-generation region to the non-power-generation region associated with power generation to decrease a concentration to a certain extent while the many cerium ions are present in the power-generation region at the beginning of the power generation. Consequently, the radical generated at the beginning of the power generation is captured to ensure the durability, and at the same time, the proton conductivity, that is, the power generation performance is ensured. Thus, the inventors achieved the present disclosure.

That is, the gist of the present disclosure is as follows.

(1) A membrane electrode assembly for a fuel cell comprises a solid polymer electrolyte membrane, an anode catalyst layer assembled to one surface of the solid polymer electrolyte membrane, and a cathode catalyst layer assembled to another surface of the solid polymer electrolyte membrane. The membrane electrode assembly contains cerium ions. The membrane electrode assembly includes a power-generation region and a non-power-generation region. The power-generation region includes the catalyst layers on both surfaces of the solid polymer electrolyte membrane in a center portion. The non-power-generation region is without the catalyst layer on at least one surface of the solid polymer electrolyte membrane in an outer periphery portion. A cerium ion content per area in the power-generation region ($\mu g$-Ce/cm$^2$) is larger than a cerium ion content per area in the non-power-generation region ($\mu g$-Ce/cm$^2$).

(2) In the membrane electrode assembly according to (1), a ratio of the cerium ion content ($\mu g$-Ce) in the non-power-generation region to a cerium ion content ($\mu g$-Ce) in the power-generation region and the non-power-generation region satisfies Formula (I) below.

cerium ion content ($\mu g$-Ce) in non-power-generation region/(cerium ion content ($\mu g$-Ce) in power-generation region+cerium ion content ($\mu g$-Ce) in non-power-generation region)$\leq 0.28$   Formula (I)

(3) In the membrane electrode assembly according to (1), a ratio of the cerium ion content ($\mu g$-Ce) in the non-power-generation region to a cerium ion content ($\mu g$-Ce) in the power-generation region and the non-power-generation region satisfies Formula (II) below.

cerium ion content ($\mu g$-Ce) in non-power-generation region/(cerium ion content ($\mu g$-Ce) in power-generation region+cerium ion content ($\mu g$-Ce) in non-power-generation region)$\leq 0.25$   Formula (II)

(4) A solid polymer fuel cell that includes the membrane electrode assembly according to any one of (1) to (3).

(5) A method for producing a membrane electrode assembly for a fuel cell is provided. The membrane electrode assembly includes a solid polymer electrolyte membrane, an anode catalyst layer assembled to one surface of the solid polymer electrolyte membrane, and a cathode catalyst layer assembled to another surface of the solid polymer electrolyte membrane. The membrane electrode assembly includes a power-generation region and a non-power-generation region. The power-generation region includes the catalyst layers on both surfaces of the solid polymer electrolyte membrane in a center portion. The non-power-generation region is without the catalyst layer on at least one surface of the solid polymer electrolyte membrane in an outer periphery portion. The method comprises adding a solution containing cerium ions and/or a compound containing cerium to a catalyst ink to prepare a catalyst ink containing the cerium ions, and applying the catalyst ink containing the cerium ions over only the power-generation region of at least one surface of the solid polymer electrolyte membrane to form the catalyst layer.

Effects

The present disclosure provides the membrane electrode assembly improved in durability while maintaining the power generation performance, and the solid polymer fuel cell including the same.

DETAILED DESCRIPTION OF THE EMBODIMENTS

Figure 1:
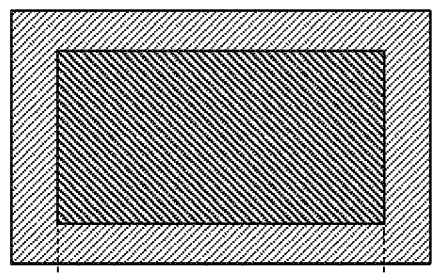
FIG. 1 is a drawing schematically illustrating a membrane electrode assembly according to one embodiment of the disclosure.
Figure 1:
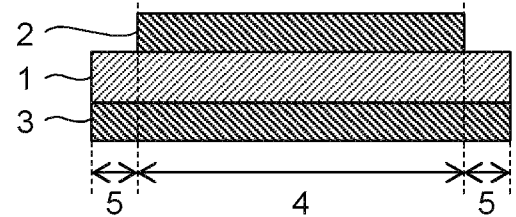

The following describes embodiments of the present disclosure in detail.

In this description, features of the present disclosure will be described with reference to the drawings as necessary. In the drawings, dimensions and shapes of respective components are exaggerated for clarification, and actual dimensions and shapes are not accurately illustrated. Accordingly, the technical scope of the present disclosure is not limited to the dimensions and the shapes of respective components illustrated in the drawings. Note that, a membrane electrode assembly and a solid polymer fuel cell of the present disclosure are not limited to the embodiments bellow, and can be performed in various configurations where changes, improvements, and the like which a person skilled in the art can make are given without departing from the gist of the present disclosure.

The present disclosure relates to a membrane electrode assembly for a fuel cell. The membrane electrode assembly includes a solid polymer electrolyte membrane, an anode catalyst layer assembled to one surface of the solid polymer electrolyte membrane, and a cathode catalyst layer assembled to the other surface of the solid polymer electrolyte membrane. The membrane electrode assembly includes cerium ions, and includes a power-generation region and a non-power-generation region. The power-generation region includes catalyst layers on both surfaces of the solid polymer electrolyte membrane in a center portion. The non-power-generation region is without the catalyst layer on at least one surface of the solid polymer electrolyte membrane in an outer periphery portion. A cerium ion content per area in the power-generation region is larger than a cerium ion content per area in the non-power-generation region.

Here, the solid polymer electrolyte membrane is an electrolyte membrane having proton conductivity in some embodiments. As the electrolyte membrane having proton conductivity, an electrolyte membrane having proton conductivity known in the technical field can be used. While not limited, for example, a membrane formed of a fluororesin having a sulfonic acid group as an electrolyte (Nafion (produced by DuPont), FLEMION (produced by AGC Inc.), Aciplex (produced by Asahi Kasei Corporation), and the like) can be used.

While not limited, a thickness of the solid polymer electrolyte membrane is ordinarily 5 µm to 50 µm to improve the function of the proton conductivity.

The anode catalyst layer serves as a fuel electrode, namely a hydrogen electrode, and the cathode catalyst layer serves as an air electrode (oxygen electrode). The catalyst layers each include an electrode catalyst (also referred to as simply "catalyst") and an electrolyte.

The catalyst is a metal-supported catalyst in some embodiments. In the metal-supported catalyst, a metal catalyst is supported on a carrier. A carrier known in the technical field can be used as the carrier. While not limited, for example, a carbon material, such as a carbon black, a carbon nanotube, and a carbon nanofiber; a carbon compound, such as a silicon carbide; a mixture of two or more of them; or the like can be used.

The metal catalyst supported on the carrier is not limited as long as a catalytic action is exhibited in the following reactions at the electrodes of the MEA.

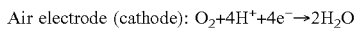
Air electrode (cathode): $O_2 + 4H^+ + 4e^- \rightarrow 2H_2O$

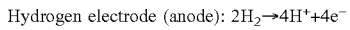
Hydrogen electrode (anode): $2H_2 \rightarrow 4H^+ + 4e^-$

A metal catalyst known in the technical field can be used. As the metal catalyst, while not limited, for example, platinum, a platinum alloy, palladium, rhodium, gold, argentum, osmium, iridium, or the like, or a mixture of two or more of them can be used. As the platinum alloy, while not limited, for example, an alloy of platinum and at least one of aluminum, chrome, manganese, iron, cobalt, nickel, gallium, zirconium, molybdenum, ruthenium, rhodium, palladium, vanadium, tungsten, rhenium, osmium, iridium, titanium, or lead can be used.

While not limited, the catalyst content in each catalyst layer is ordinarily 5 weight % to 40 weight % relative to the total weight of the catalyst layer.

An ionomer is used as the electrolyte in some embodiments. The ionomer is also referred to as a cation-exchange resin, and exists as a cluster formed of ionomer molecules.

As the ionomer, an ionomer known in the technical field can be used. While not limited, for example, a fluororesin-based electrolyte, such as a perfluorosulfonic acid resin material, a sulfonated plastic-based electrolyte, such as sulfonated polyether ketone, sulfonated polyethersulfone, sulfonated polyether ether sulfone, sulfonated polysulfone, sulfonated polysulfide, or sulfonated polyphenylene, a sulfoalkylated plastic-based electrolyte, such as sulfoalkylated polyether ether ketone, sulfoalkylated polyethersulfone, sulfoalkylated polyetherethersulfone, sulfoalkylated polysulfone, sulfoalkylated polysulfide, or sulfoalkylated polyphenylene, or a mixture of two or more of them can be used.

While the thickness of each catalyst layer is not limited, the thickness is ordinarily 1 µm to 20 µm to ensure the amount of the catalyst necessary for power generation and to keep the low proton resistance.

The membrane electrode assembly of the present disclosure contains cerium ions. Here, the cerium ions exist as trivalent cerium ions ($Ce^{3+}$) or tetravalent cerium ions ($Ce^{4+}$).

The cerium ions are contained in at least one of the solid polymer electrolyte membrane, the anode catalyst layer, or the cathode catalyst layer. In other words, at least one of the solid polymer electrolyte membrane, the anode catalyst layer, or the cathode catalyst layer contain the cerium ions.

The membrane electrode assembly of the present disclosure includes the power-generation region and the non-power-generation region. The power-generation region includes the catalyst layers, that is, the anode catalyst layer and the cathode catalyst layer, on both surfaces of the solid polymer electrolyte membrane in the center portion of the membrane electrode assembly (i.e. the power-generation region is a region in which the anode catalyst layer, the solid polymer electrolyte membrane, and the cathode catalyst layer are present to perform the power generation). The non-power-generation region is without the catalyst layer, that is, the anode catalyst layer or the cathode catalyst layer, on at least one surface of the solid polymer electrolyte membrane in the outer periphery portion of the membrane electrode assembly (i.e. the non-power-generation region is a region in which the anode catalyst layer, the cathode catalyst layer, or both of the anode catalyst layer and the cathode catalyst layer are absent, thus not performing the power generation). In other words, the power-generation region including the catalyst layers on both surfaces of the solid polymer electrolyte membrane is provided in the center portion of the membrane electrode assembly of the present disclosure, and the non-power-generation region without the catalyst layer on at least one surface of the solid polymer electrolyte membrane is provided in the outer periphery portion of the membrane electrode assembly of the present disclosure.

FIG. 1 schematically illustrates the membrane electrode assembly according to one embodiment of the present disclosure in a plan view and a cross-sectional view. The membrane electrode assembly illustrated in FIG. 1 includes a power-generation region 4 in the center portion and a non-power-generation region 5 in the outer periphery portion. The power-generation region 4 includes a solid polymer electrolyte membrane 1 and electrodes 2, 3. The electrodes 2, 3 are catalyst layers disposed on an upper surface and a lower surface of the solid polymer electrolyte membrane 1. The non-power-generation region 5 includes the solid polymer electrolyte membrane 1 and the electrode 3 that is a catalyst layer disposed on only the lower surface of the solid polymer electrolyte membrane 1.

In the membrane electrode assembly of the present disclosure, the cerium ion content per area in the power-generation region (µg-Ce/cm$^2$) is larger than the cerium ion content per area in the non-power-generation region (µg-Ce/cm$^2$). The cerium ion content per area in the power-generation region or the non-power-generation region can be measured by the component analysis, such as ICP, in each region.

When a two-electron reaction, not a four-electron reaction, occurs during the power generation in the power-generation region of the membrane electrode assembly of the present disclosure, hydrogen peroxide is generated, and thereafter, a Fenton reaction causes,

$H_2O_2 \rightarrow OH$ radical, and the generated OH radical decomposes and degrades the solid polymer electrolyte membrane. The two-electron reaction especially proceeds at the beginning of the power generation immediately after the production because the two-electron reaction easily proceeds on a platinum catalyst that contains various contamination components (including organic matters) immediately after the production. Subsequently, since the contamination components are washed away outside the power generation system by generated water when the power generation is continued, the influence of the OH radical generated in the two-electron reaction becomes minor.

Thus, in the membrane electrode assembly of the present disclosure, the cerium ion content per area in the power-generation region is made larger than the cerium ion content per area in the non-power-generation region. Accordingly, the maximum amount of the cerium ions are present in the power-generation region at the beginning of the power generation. Subsequently, the cerium ions diffuse over time from the power-generation region to the non-power-generation region in association with the power generation, thus decreasing in the power-generation region to be uniformed in the entire membrane electrode assembly. Consequently, the proton resistance increase, which is possibly caused by the excess cerium ions, that is, the antinomic relation to the power generation performance of the fuel cell, can be suppressed.

In the membrane electrode assembly of the present disclosure, a ratio of the cerium ion content (μg-Ce) in the non-power-generation region to the total cerium ion content (μg-Ce) (cerium ion content (μg-Ce) in power-generation region+cerium ion content (μg-Ce) in non-power-generation region) contained in the MEA is adjusted so as to satisfy Formula (I) below. The ratio has a value of (cerium ion content (μg-Ce) in non-power-generation region/(cerium ion content (μg-Ce) in power-generation region+cerium ion content (μg-Ce) in non-power-generation region)=cerium ion amount ratio in non-power-generation region).

Cerium ion content (μg-Ce) in non-power-generation region/(cerium ion content (μg-Ce) in power-generation region+cerium ion content (μg-Ce) in non-power-generation region) 0.28     Formula (I)

In some embodiments, Formula (II) below is satisfied.

Cerium ion content (μg-Ce) in non-power-generation region/(cerium ion content (μg-Ce) in power-generation region+cerium ion content (μg-Ce) in non-power-generation region)≤0.25     Formula (II)

The cerium ion amount ratio in the non-power-generation region can be calculated from the areas of the power-generation region and the non-power-generation region, and the cerium ion contents per area of the power-generation region and the non-power-generation region measured by the component analysis, such as ICP.

As described above, while the reduction in performance of the fuel cell can be suppressed by the diffusion of the cerium ions from the power-generation region to the non-power-generation region, the excessive diffusion of the cerium ions causes the cerium ion content in the power-generation region to excessively decrease, thereby possibly reducing the durability.

Accordingly, the cerium ion amount ratio in the non-power-generation region is adjusted in the above-described range so as to avoid the excessive decrease of the cerium ion content in the power-generation region, thereby allowing suppressing the durability reduction.

In the membrane electrode assembly of the present disclosure, while a sulfonic acid content (meq/cm²-MEA) contained in the MEA is not limited, the sulfonic acid content (meq/cm²-MEA) is ordinarily 0.0005 meq/cm²-MEA to 0.01 meq/cm²-MEA, or the sulfonic acid content (meq/cm²-MEA) is 0.001 meq/cm²-MEA to 0.005 meq/cm²-MEA in some embodiments. The sulfonic acid content (meq/cm²-MEA) contained in the MEA can be calculated from the amounts of the sulfonic acid contained in the materials used for the solid polymer electrolyte membrane, the anode catalyst layer, and the cathode catalyst layer. Alternatively, the sulfonic acid content (meq/cm²-MEA) contained in the MEA can be measured by the component analysis of the MEA.

In the membrane electrode assembly of the present disclosure, the total cerium ion content (μg-Ce) contained in the MEA can be changed depending on the amount of the sulfonic acid contained in the electrolyte to be protected from the radical. For example, the total cerium ion content (μg-Ce) contained in the MEA is adjusted such that a value (A/B) obtained by dividing a total cerium ion content A (mmol) contained in the MEA by a total sulfonic acid content B (meq) contained in the MEA is ordinarily 0.001 (mol/eq) to 0.1 (mol/eq), the value (A/B) is 0.005 (mol/eq) to 0.05 (mol/eq) in some embodiments, or the value (A/B) may be 0.01 (mol/eq) to 0.02 (mol/eq) in some embodiments.

The membrane electrode assembly of the present disclosure can be produced in accordance with the production method of the membrane electrode assembly known in the technical field except that a solution containing the cerium ions, for example, cerium nitrate is added to a catalyst ink when the anode catalyst layer and/or the cathode catalyst layer disposed only in the power-generation region of the membrane electrode assembly is produced, and the relation between the cerium ion content in the power-generation region and the cerium ion content in the non-power-generation region is adjusted as described above, that is, the cerium ion content per area in the power-generation region is made large compared with the cerium ion content per area in the non-power-generation region, and the cerium ion amount ratio in the non-power-generation region may be set in the above-described range in some embodiments. The cerium ion may be introduced by adding a compound containing cerium, for example, cerium oxide and dissolving the compound.

For example, when the catalyst layer present only in the power-generation region of the membrane electrode assembly is the anode catalyst layer, a solution containing cerium ions and/or a compound containing cerium is added to a catalyst ink for producing the anode catalyst layer, and the catalyst ink is applied over the solid polymer electrolyte membrane to form the anode catalyst layer, thus producing the membrane electrode assembly. Thus, the cerium ions diffuse from the anode catalyst layer to the cathode catalyst layer adjacent to the opposite side of the anode catalyst layer on the solid polymer electrolyte membrane, the non-power-generation region of the solid polymer electrolyte membrane, and the non-power-generation region of the cathode catalyst layer via the adjacent solid polymer electrolyte membrane in association with the power generation. Therefore, the membrane electrode assembly of the present disclosure in which the cerium ion content per area in the power-generation region is larger than the cerium ion content per area in the non-power-generation region can be produced. In this membrane electrode assembly, the cerium ion amount ratio in the non-power-generation region is in the above-described range in some embodiments.

For example, when the catalyst layer present only in the power-generation region of the membrane electrode assembly is the cathode catalyst layer, a solution containing cerium ions and/or a compound containing cerium is added to a catalyst ink for producing the cathode catalyst layer, and the catalyst ink is applied over the solid polymer electrolyte membrane to form the cathode catalyst layer, thus producing the membrane electrode assembly. Thus, the cerium ions diffuse from the cathode catalyst layer to the anode catalyst layer adjacent to the opposite side of the cathode catalyst layer on the solid polymer electrolyte membrane, the non-power-generation region of the solid polymer electrolyte membrane, and the non-power-generation region of the anode catalyst layer via the adjacent solid polymer electrolyte membrane in association with the power generation. Therefore, the membrane electrode assembly of the present disclosure in which the cerium ion content per area in the power-generation region is larger than the cerium ion content per area in the non-power-generation region can be produced. In this membrane electrode assembly, the cerium ion amount ratio in the non-power-generation region is in the above-described range in some embodiments.

For example, when the catalyst layers present only in the power-generation region of the membrane electrode assembly are the anode catalyst layer and the cathode catalyst layer, a solution containing cerium ions and/or a compound containing cerium is added to a catalyst ink for producing the anode catalyst layer and/or the cathode catalyst layer, and the catalyst ink is applied over the solid polymer electrolyte membrane to form the anode catalyst layer and/or the cathode catalyst layer, thus producing the membrane electrode assembly. Thus, the cerium ions diffuse from the anode catalyst layer and/or the cathode catalyst layer to the non-power-generation region of the solid polymer electrolyte membrane via the adjacent solid polymer electrolyte membrane in association with the power generation. Therefore, the membrane electrode assembly of the present disclosure in which the cerium ion content per area in the power-generation region is larger than the cerium ion content per area in the non-power-generation region can be produced. In this membrane electrode assembly, the cerium ion amount ratio in the non-power-generation region is in the above-described range in some embodiments.

In the membrane electrode assembly of the present disclosure, the gas diffusion layers may be assembled to the opposite surfaces of the surfaces assembled to the electrolyte membranes of the respective catalyst layers, that is, both surfaces of the MEA. The gas diffusion layer is a conductive porous sheet in some embodiments. A conductive porous sheet known in the technical field can be used as the conductive porous sheet. While not limited, for example, a sheet formed of a material having air permeability or liquid permeability, such as a carbon cloth and a carbon paper, can be used.

Furthermore, a unit cell is formed by disposing separators, through which a gas flows, on both surfaces of the membrane electrode assembly or the MEGA of the present disclosure. In addition, by stacking a plurality of the unit cells, the solid polymer fuel cell of the present disclosure is formed.

The solid polymer fuel cell of the present disclosure has the improved durability and power generation performance.

EXAMPLES

While the following describes some examples according to the present disclosure, it is not intended to limit the present disclosure to these examples.

The membrane electrode assembly (MEA) was prepared as illustrated in FIG. 1 so as to include the power-generation region including the catalyst layers on both surfaces of the solid polymer electrolyte membrane in the center portion and the non-power-generation region without the catalyst layer on one surface of the solid polymer electrolyte membrane in the outer periphery portion. Thus, the membrane electrode assembly (MEA) was produced such that the cerium ion content per area in the power-generation region ($\mu g$-Ce/cm$^2$) was larger than the cerium ion content per area in the non-power-generation region ($\mu g$-Ce/cm$^2$), and the ratio of the cerium ion content ($\mu g$-Ce) in the non-power-generation region to the total cerium ion content ($\mu g$-Ce) contained in the MEA had various values. The ratio has values of {cerium ion amount ratio in non-power-generation region=cerium ion content ($\mu g$-Ce) in non-power-generation region/(cerium ion content ($\mu g$-Ce) in power-generation region+cerium ion content ($\mu g$-Ce) in non-power-generation region)}.

A durability test was conducted for each of the obtained MEAs, and normalized durability indices were obtained assuming that the durability of the MEA was 1 at the cerium ion amount ratio in the non-power-generation region=0, that is, when the cerium ion content in the non-power-generation region was 0 $\mu g$-Ce. The durability test was performed by measuring the proton resistances, which are measured by frequency response analysis, of the anode catalyst layer and the cathode catalyst layer due to the power generation and the amount of sulfonic acid decomposition due to the power generation measured by the component analysis of MEA degradation products.

Figure 2:
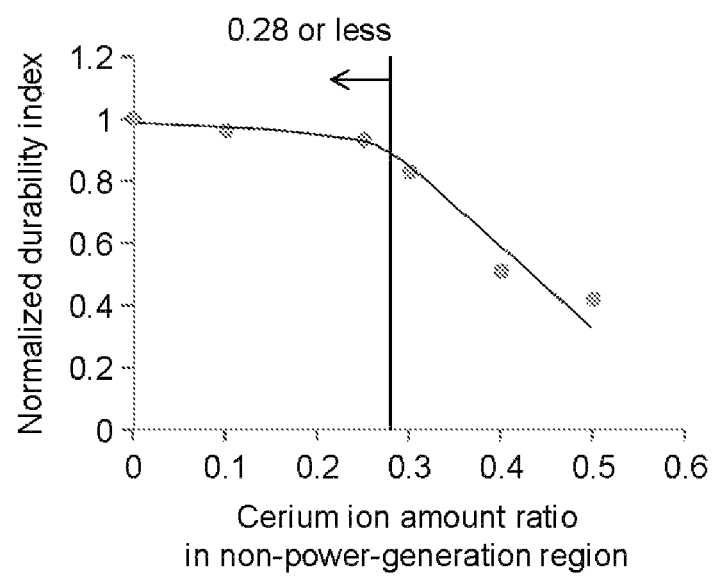
FIG. 2 is a graph illustrating a relation between cerium ion amount ratios in non-power-generation region and normalized durability indices in the membrane electrode assemblies produced in examples.

FIG. 2 illustrates the relation between the cerium ion amount ratio in the non-power-generation region and the normalized durability index. It is seen from FIG. 2 that the normalized durability index can be kept in high level when the cerium ion amount ratio in the non-power-generation region is 0.28 or less, or 0.25 or less in some embodiments.

All publications, patents and patent applications cited in the present description are herein incorporated by reference as they are.

What is claimed is:

1. A membrane electrode assembly for a fuel cell, comprising:
   a solid polymer electrolyte membrane;
   an anode catalyst layer assembled to one surface of the solid polymer electrolyte membrane; and
   a cathode catalyst layer assembled to another surface of the solid polymer electrolyte membrane,
   wherein the membrane electrode assembly contains cerium ions,
   wherein the membrane electrode assembly includes a power-generation region and a non-power-generation region, the power-generation region includes the catalyst layers on both surfaces of the solid polymer electrolyte membrane in a center portion, and the non-power-generation region is without the catalyst layer on at least one surface of the solid polymer electrolyte membrane in an outer periphery portion, and wherein a cerium ion content per area in the power-generation region is larger than a cerium ion content per area in the non-power-generation region.

2. The membrane electrode assembly according to claim 1, wherein a ratio of the cerium ion content in the non-power-generation region to a cerium ion content in the power-generation region and the non-power-generation region satisfies Formula (I) below, cerium ion content in non-power-generation region/(cerium ion content in power-generation region+cerium ion content in non-power-generation region)≤0.28    Formula (I).

3. The membrane electrode assembly according to claim 1, wherein a ratio of the cerium ion content in the non-power-generation region to a cerium ion content in the power-generation region and the non-power-generation region satisfies Formula (II) below, cerium ion content in non-power-generation region/(cerium ion content in power-generation region+cerium ion content in non-power-generation region)≤0.25    Formula (II).

4. A solid polymer fuel cell that includes the membrane electrode assembly according to claim 1.

5. A solid polymer fuel cell that includes the membrane electrode assembly according to claim 2.

6. A solid polymer fuel cell that includes the membrane electrode assembly according to claim 3.

* * * * *